(12) United States Patent
Fayard

(10) Patent No.: US 11,661,205 B2
(45) Date of Patent: May 30, 2023

(54) SYSTEM AND METHOD FOR AIR FILTRATION WITH SELF-CLEANING FILTER MEDIUM FOR AN AIRCRAFT ENGINE

(71) Applicant: AIRBUS HELICOPTERS, Marignane (FR)

(72) Inventor: Benoit Fayard, Saint Chamas (FR)

(73) Assignee: AIRBUS HELICOPTERS, Marignane (FR)

( * ) Notice: Subject to any disclaimer, the term of this patent is extended or adjusted under 35 U.S.C. 154(b) by 0 days.

(21) Appl. No.: 17/321,945

(22) Filed: May 17, 2021

(65) Prior Publication Data

US 2021/0403172 A1 Dec. 30, 2021

(30) Foreign Application Priority Data

Jun. 30, 2020 (FR) ...................................... 2006839

(51) Int. Cl.
*B64D 33/02* (2006.01)
*F02C 7/052* (2006.01)
*F02C 7/057* (2006.01)

(52) U.S. Cl.
CPC .............. *B64D 33/02* (2013.01); *F02C 7/052* (2013.01); *F02C 7/057* (2013.01); *B64D 2033/0246* (2013.01); *F05D 2220/323* (2013.01); *F05D 2260/607* (2013.01); *F05D 2270/114* (2013.01)

(58) Field of Classification Search
CPC .............. B64D 33/02; B64D 2033/022; B64D 2033/0246; B64D 2033/0253; F02C 7/05; F02C 7/052; F02C 7/057; F05D 2220/323; F05D 2260/607
See application file for complete search history.

(56) References Cited

U.S. PATENT DOCUMENTS

| 2,407,194 | A | 9/1946 | Gordon |
| 3,998,048 | A | 12/1976 | Derue |
| 2009/0139200 | A1 | 6/2009 | Colaprisco |

(Continued)

FOREIGN PATENT DOCUMENTS

| EP | 1326698 A2 | 7/2003 | |
| EP | 3392484 A1 * | 10/2018 | ............. F01D 17/02 |

(Continued)

OTHER PUBLICATIONS

French Search Report for French Application No. FR2006839, Completed by the French Patent Office, dated Mar. 2, 2021, 8 pages.

*Primary Examiner* — Steven M Sutherland
(74) *Attorney, Agent, or Firm* — Brooks Kushman P.C.

(57) ABSTRACT

A method for supplying air to an engine of an aircraft via an air supply system of the aircraft. A dynamic air intake vent of the system can be closed by a closure member that is movable between a closed position and an open position. A static air intake vent is equipped with a filter medium. During flight, the method comprises an unfiltered operating mode that comprises the following steps: positioning of the closure member in the open position, and, during a phase of forward travel of the aircraft, dynamic intake of a flow of air, then transfer of a first portion of the flow of air to the engine and a second portion of the flow of air to the filter medium in order to clean the filter medium.

15 Claims, 3 Drawing Sheets

(56) References Cited

U.S. PATENT DOCUMENTS

| | | | | |
|---|---|---|---|---|
| 2011/0001003 A1* | 1/2011 | Krahl | ................ | B01D 46/0035 |
| | | | | 96/400 |
| 2011/0108676 A1 | 5/2011 | Colaprisco | | |
| 2014/0158833 A1* | 6/2014 | Braeutigam | ........... | B64D 33/02 |
| | | | | 96/405 |
| 2016/0208695 A1* | 7/2016 | Wells | ...................... | F02C 7/045 |
| 2018/0043986 A1* | 2/2018 | Miller | ..................... | B64C 27/14 |
| 2018/0208323 A1* | 7/2018 | Parsons | .................. | B64D 33/02 |

FOREIGN PATENT DOCUMENTS

| | | |
|---|---|---|
| FR | 2250671 A1 | 6/1975 |
| FR | 2904046 A1 | 1/2008 |
| FR | 2906569 A1 | 4/2008 |
| FR | 2924471 A1 | 6/2009 |
| FR | 2952401 A1 | 5/2011 |
| WO | 200220133 A2 | 3/2002 |
| WO | 2018200941 A1 | 11/2018 |

* cited by examiner

SYSTEM AND METHOD FOR AIR FILTRATION WITH SELF-CLEANING FILTER MEDIUM FOR AN AIRCRAFT ENGINE

CROSS-REFERENCE TO RELATED APPLICATIONS

This application claims priority to French patent application No. FR 20 06839 filed on Jun. 30, 2020, the disclosure of which is incorporated in its entirety by reference herein.

TECHNICAL FIELD

The present disclosure concerns a system and a method for air filtration with a self-cleaning filter medium for filtering an oxidizer for an aircraft engine, for example in a rotorcraft.

BACKGROUND

Indeed, an aircraft is normally equipped with a power plant comprising at least one combustion engine supplied with air by an air intake. In order to convey air into this air intake, the aircraft may comprise an air supply system bringing an environment external to the aircraft into fluidic communication with the air intake of the engine.

A first type of air supply is described as dynamic. A dynamic air supply system comprises an air vent facing in the direction of forward travel of the aircraft in order to be supplied with outside air as a result of the forward speed of the aircraft and the wind, and the engine sucking in air during operation.

A second type of air supply is described as static. A static air supply system is only supplied with air as a result of the engine sucking in air during operation.

These two types of air supply can be combined within the same air supply system.

Moreover, "pollutants" such as dust, sand, snow and frost are likely to penetrate into an air supply system. These pollutants are likely to degrade engine performance through erosion or clogging.

Therefore, an air supply system can be equipped with an air filtration device in order to at least limit the intake of pollutants.

Two known types of filtration devices are effective for small pollutants, namely vortex particulate filter devices or indeed barrier filter devices.

A filtration device of the barrier filter type is also known as an "inlet barrier filter". A filtration device of the barrier filter type comprises a filter referred to as a "filter medium". Such a filter medium comprises a porous barrier. Small passages run all the way through the thickness of the porous barrier. These passages prevent objects larger than the dimensions of the passages from passing through the barrier. For example, a filter medium may comprise one or more layers of fibers, such as cotton fibers or synthetic fibers, each layer optionally being concertina-folded in order to maximize its filtering surface area. Air therefore passes through the filter medium, and the pollutants that are not able to pass through a passage remain stuck against an outer face of the filter medium. Therefore, a filtration device with a filter medium is very effective. However, the filter medium generates installation losses that depend on its clogging.

Various techniques can be used to evaluate the clogging of a filter medium. For example, document WO2018/200941 discloses a pressure measuring device.

When the filter medium is clogged, a maintenance operation is carried out in order to replace it. In an aircraft, the clogging of the filter medium varies depending on the environmental conditions encountered and the use of the aircraft. For example, a filter medium that filters air upstream of a helicopter engine tends to clog more quickly when the helicopter flies at low speeds in sandy air. The service life of a filter medium is therefore variable depending on its use, and can be relatively short in extreme conditions.

The disclosure aims to optimize this service life.

Document FR 2 904 046 does not address this issue, describing a combined air supply system without a filter medium. This air supply system comprises a dynamic air intake vent opening on a pipe. The dynamic air intake vent is capable of being closed by a closure means and is equipped with a grating. Moreover, the air supply system comprises a filtering intake provided with a plurality of vortex particulate filters, the filtering intake opening on the pipe.

Similarly, document FR 2 906 569 describes an air supply system comprising at least one filtering radial air intake having vortex particulate filters and one non-filtering radial air intake, the filtering and non-filtering radial air intakes being arranged around a turboshaft engine. A moveable closure means is configured to close the filtering and non-filtering radial air intakes one after another.

Document FR 2 924 471 describes an air supply system having an air intake section. A filtration device comprises a foldable filter means arranged at the air intake section and a control means that applies force to the filter means so as to adjust the filtering power of the filtration system.

Document FR 2 952 401 also describes an air supply system without a filter medium. This air supply system comprises a dynamic air intake pipe provided with a grating protecting against the intake of external matter. The grating is capable of moving in translation relative to the dynamic air intake pipe depending on its clogging. The air supply system also comprises a side intake and a means for closing said side intake controlled by said translational movement of the grating.

Document EP 1 326 698 describes a cleaning system with a pulse jet oriented so as to direct an air pulse into a clean air chamber inside a filter structure.

Document FR 2 250 671 A1 describes an air supply system configured to supply air to an engine. This air supply system comprises a movable ogive and an inertial separator filtration device.

Document U.S. Pat. No. 2,407,194 A is also known.

SUMMARY

The object of the present disclosure is therefore to propose a method and system for supplying air with a filter medium, which is advantageously relatively lightweight, with the aim of optimizing the service life of the filter medium.

Therefore, the disclosure relates to a method for supplying air to an aircraft engine, in particular a combustion engine, at an air supply flow rate via an air supply system of the aircraft, said air supply system comprising a dynamic air intake vent that can be closed by a closure member, said closure member being movable between a closed position in which the closure member closes said dynamic air intake vent and an open position in which the closure member does not close said dynamic air intake vent, said air supply system comprising a static air intake vent equipped with a filtration device, said closure member being in the closed position during a filtered operating mode during which air from an external environment situated outside the aircraft is filtered by the filtration device.

The filtration device comprising a filter medium, this method comprises, during flight, an unfiltered operating mode that comprises the following steps:

positioning of the closure member in the open position, so as to no longer close dynamic air intake vent; and during a phase of forward travel of the aircraft, dynamic intake of a flow of air as a result of the forward travel of the aircraft via the dynamic air intake vent at an air intake flow rate higher than a minimum flow rate necessary in order to obtain said air supply flow rate; then transfer of a first portion of said flow of air to said engine and transfer of a second portion of said flow of air to the filter medium, said second portion of said flow of air passing through the filter medium to return to the external environment in order to clean the filter medium.

The expression "dynamic intake of a flow of air as a result of the forward travel of the aircraft via the dynamic air intake vent" means that the flow of air enters the air supply system via the dynamic air intake vent at least as a result of the forward travel of the aircraft, and possibly also due to suction from an engine.

The expression "between a closed position in which the closure member closes said dynamic air intake vent and an open position" means that the closure member can be moved from the open position to the closed position and from the closed position to the open position. Intermediate positions may optionally be reached, the closure member remaining arranged in such intermediate positions at least temporarily.

In this context, the air supply system can be either in a filtered operating mode during which the closure member is in the closed position, or in an unfiltered operating mode during which the closure member is in the open position.

During the filtered operating mode, the air situated in the external environment passes through the filter medium in a direction, referred to for the sake of convenience as the "filtration direction", travelling from an outer face of the filter medium in contact with the external environment towards an inner face of the filter medium. Any pollutants in the air are blocked by the filter medium at its outer face, within the operating limits of this filter medium, obviously. The air cleaned of any pollutants is then conveyed to the engine by the air supply system. The filter medium fulfils its function by tending to prevent the intake of potentially damaging pollutants by the engine, such as dust, earth or sand, for example.

According to the disclosure, the method also comprises an unfiltered operating mode including a phase of supplying air to and automatically cleaning the filter medium, the filter medium being immobile, which is implemented during a flight phase referred to as a "phase of forward travel of the aircraft". Such a phase of forward travel is, for example, a phase during which the aircraft at least moves forwards in a direction from the tail towards a nose of the aircraft. When this phase of supplying air to and cleaning the filter medium is implemented, the closure member is placed in its open position. Because the aircraft is travelling forwards, an air supply duct of the air supply system is boosted with air by the dynamic air intake vent. In particular, the dynamic air intake vent is innovatively oversized in order to capture more air than necessary in order to obtain the air supply flow rate required by the engine. The dynamic air intake vent can be sized in a conventional manner, by calculations and/or simulations and/or tests, in order to allow a flow rate higher than a predetermined air supply flow rate specified for the engine to be obtained. Due at least to the difference in flow rate between the actual air intake flow rate and the minimum flow rate needed to supply the engine, a first portion of the flow of air is conveyed towards the engine and sucked in by this engine whereas a second portion of this flow of air is discharged out of the air supply system via the only possible path. In particular, this second portion of the incoming flow of air passes through the filter medium in the opposite direction to the previously described filtration direction. Therefore, any pollutants previously captured by the outer face of the filter medium are blown back out to the external environment. The clogging level of the filter medium then drops and moves away from a clogging threshold requiring a maintenance operation.

During the unfiltered operating mode, if the aircraft is not in said phase of forward travel as previously defined, the engine can suck in air via the filter medium and/or the dynamic air intake vent.

Consequently, during the phase of supplying air to and cleaning the filter medium, this method makes it possible to clean the filter medium during flight, without taking action on the filter medium, i.e., above the ground, using an oversized dynamic air intake vent while the aircraft is moving forwards.

This method therefore makes it possible to protect an engine from pollutants in the flight phases where this is required, at least as long as the filter medium is not totally clogged, and to clean the filter medium during flight if necessary and/or if possible.

The method thus makes it possible, depending on the use of the aircraft, to increase the service life of the filter medium and delay a maintenance operation.

The method may further comprise one or more of the following features, taken individually or in combination.

The filtered operating mode can be implemented as a function of one or more of the following parameters.

Thus, the method can comprise a step of detecting air pollution in said external environment, the implementation of the unfiltered operating mode, and indeed of the filtered operating mode, being a function at least of said air pollution in said external environment.

The air can be considered to be unpolluted when this air contains, in a certain volume, a number of particles lower than a particle threshold.

Additionally or alternatively to the preceding possibilities, the method may comprise a step of detecting a clogging level of said filter medium, the implementation of the unfiltered operating mode, and indeed of the filtered operating mode, being a function at least of said clogging level.

Additionally or alternatively to the preceding possibilities, said method comprises a step of detecting that said aircraft is moving in said at least one phase of forward travel, the implementation of the unfiltered operating mode, and indeed of the filtered operating mode, being a function at least of said detection that said aircraft is moving in said at least one phase of forward travel.

Said at least one phase of forward travel can comprise a phase of movement of said aircraft in a predetermined direction relative to a reference frame of said aircraft and at a speed higher than a speed threshold. For example, such a speed threshold is of the order of 100 knots or 115 miles per hour.

According to one example compatible with the preceding examples, said method may comprise a step of detecting the nature of the overflown terrain, the implementation of the unfiltered operating mode being a function at least of said nature. For example, said nature can be chosen from a list comprising at least one of the following elements: a desert area, a populated area, a town, a forest, a stretch of water, etc. The nature of the overflown terrain can be evaluated by combining the current geographical position of the aircraft, for example its latitude and its longitude, with a stored map containing said terrain and its nature.

Additionally or alternatively, the method may comprise a step of generating a control signal with a control, activated by a pilot, the implementation of the unfiltered operating mode being a function at least of said control signal.

The air supply system may comprise one or more manual, voice or visual controls, for controlling the closure member and therefore for directly or indirectly choosing the operating mode of the air supply system.

For example, one control may be used to control an actuator moving the closure member between its closed position and its open position.

According to another example, a control may allow a pilot to choose one mode of operation from a list of modes of operation, each mode of operation controlling the closure member as a function of at least one of the preceding parameters.

The various preceding conditions can be cumulative and possibly hierarchical. The conditions used and/or the hierarchy can vary depending optionally on a chosen mode of operation.

For example, the filtered operating mode can be implemented automatically by moving the closure member to its closed position if pollution is detected, and indeed also if the filter medium has a clogging level lower than a clogging threshold.

According to one example, the choice of the filtered or unfiltered operating mode can only be made by a pilot by means of a control provided for this purpose. The pilot can therefore choose the position of the closure member depending on the flight conditions and/or the mission to be carried out, and/or the environment and/or his choice whether or not to optimize the service life of the filter medium.

According to one example, the unfiltered operating mode is implemented automatically by positioning the closure member in its open position only if said aircraft is moving in said at least one phase of forward travel and/or if the clogging level of the filter medium is greater than or equal to a clogging threshold.

It is also possible to provide various modes of operation that can be chosen by a pilot with a suitable control.

For example, according to an economic mode of operation, the closure member is positioned by default in its closed position and positioned in its open position only as long as no pollution is detected and the forward speed is higher than the speed threshold.

According to a mode of operation for optimum protection, the closure member is positioned by default in its open position, then positioned in its closed position until the end of the flight if pollution is detected and if, at the same time, the overflown terrain is a desert area.

According to a mode of operation that prioritizes performance, the closure member is positioned by default in its closed position, then positioned in its open position as long as no pollution is detected and the overflown terrain is a town.

In all instances, the unfiltered operating mode may be implemented automatically by positioning the closure member in its open position if the clogging level of the filter medium is greater than or equal to a clogging threshold.

These various modes of operation are provided as examples in order to indicate that the different variants cited above are compatible with each other.

In addition to a method, the disclosure also relates to a system suitable for applying this method, or indeed configured to apply this method.

This air supply system is configured to supply air to an aircraft engine at an air supply flow rate, said air supply system comprising a dynamic air intake vent that can be closed by a movable closure member, said closure member being movable between a closed position in which the closure member closes said dynamic air intake vent and an open position in which the closure member does not close said dynamic air intake vent, said air supply system comprising a static air intake vent equipped with a filtration device.

Moreover, the filtration device comprises a filter medium that opens on an air supply duct of said air supply system. This air supply duct opens directly, or via one or more pipes, on the engine to be supplied with air. Said dynamic air intake vent is fluidically connected to the air supply duct upstream of the filter medium in a direction from the dynamic air intake vent towards the engine to be supplied. Said dynamic air intake vent is oversized in order to dynamically take in a flow of air during a phase of forward travel of said aircraft in an unfiltered operating mode, at an air intake flow rate higher than a minimum flow rate necessary in order to obtain said air supply flow rate, in order for a first portion of said flow of air to be conveyed to said engine and a second portion of said flow of air to exit said air supply duct via said filter medium for cleaning purposes.

Therefore, the filter medium and the dynamic air intake vent both lead to the air supply duct, this air supply duct having an outlet configured to supply air to the engine.

The expression "Said dynamic air intake vent is fluidically connected to the air supply duct upstream of the filter medium in a direction from the dynamic air intake vent towards the engine to be supplied" means that the filter medium leads to the air supply duct between said outlet of the air supply duct and the dynamic air intake vent. For example, the filter medium comprises an inner face that locally delimits the air supply duct between said outlet of the air supply duct and the dynamic air intake vent.

For example, the filter medium is stationary in a reference frame of the air supply system, in particular relative to the other components of the system and, for example, to the air supply duct, unlike a rotary device.

The system may comprise one or more of the following features, taken individually or in combination.

Thus, the air supply system may comprise an actuation device equipped with an actuator cooperating with said closure member, said actuator being configured to move said closure member between the open position and the closed position.

The actuation device may comprise a controller that may or may not be independent of the actuator, and may or may not be dedicated to this application, for controlling the actuator by applying the method of the disclosure as a function of one or more analog or digital received signals.

For example, the air supply system may comprise at least one control that can be activated by a pilot, said at least one control being connected via a wired or wireless link to the actuation device.

For example, the air supply system may comprise at least one pollution sensor connected via a wired or wireless link to the actuation device, said pollution sensor being configured to emit a pollution signal carrying information indicating whether the air present in the external environment is polluted.

For example, such a pollution sensor may comprise a conventional particle sensor, a frost sensing device, etc. The particle sensor may be arranged on the outside of the air supply duct, optionally close to the dynamic air intake vent or the filter medium.

For example, the air supply system may comprise a forward travel sensor configured to emit a forward travel signal transmitted via a wired or wireless link to the actuation device, the forward travel signal carrying information indicating that said aircraft is moving in said at least one phase of forward travel.

Such a forward travel sensor may comprise a conventional speed sensing device, for example a sensing device of a satellite positioning system, a Pitot probe, etc.

For example, the air supply system comprises a clogging sensor configured to emit a clogging signal transmitted via a wired or wireless link to the actuation device, the clogging signal carrying information indicating that said filter medium has a clogging level greater than or equal to a clogging threshold.

Such a sensor can be of a known type. For example, such a sensor comprises a pressure sensing device measuring the pressure upstream of the filter medium and a pressure sensing device measuring the air pressure downstream of the filter medium, a computer of the sensor or the controller compiling the measurements in order to determine the clogging level of the filter medium.

According to one example compatible with the preceding examples, said air supply system may comprise a positioning sensor configured to emit a positioning signal transmitted via a wired or wireless link to the actuation device, the positioning signal carrying information indicating the geographical position of the aircraft.

Moreover, the disclosure also relates to an aircraft equipped with at least one engine, this aircraft comprising an air supply system according to the disclosure for conveying air present in an external environment situated outside said aircraft towards said engine.

BRIEF DESCRIPTION OF THE DRAWINGS

The disclosure and its advantages appear in greater detail from the following description of examples given by way of illustration with reference to the accompanying figures, in which.

DETAILED DESCRIPTION

Elements present in more than one of the figures are given the same references in each of them.

Figure 1:
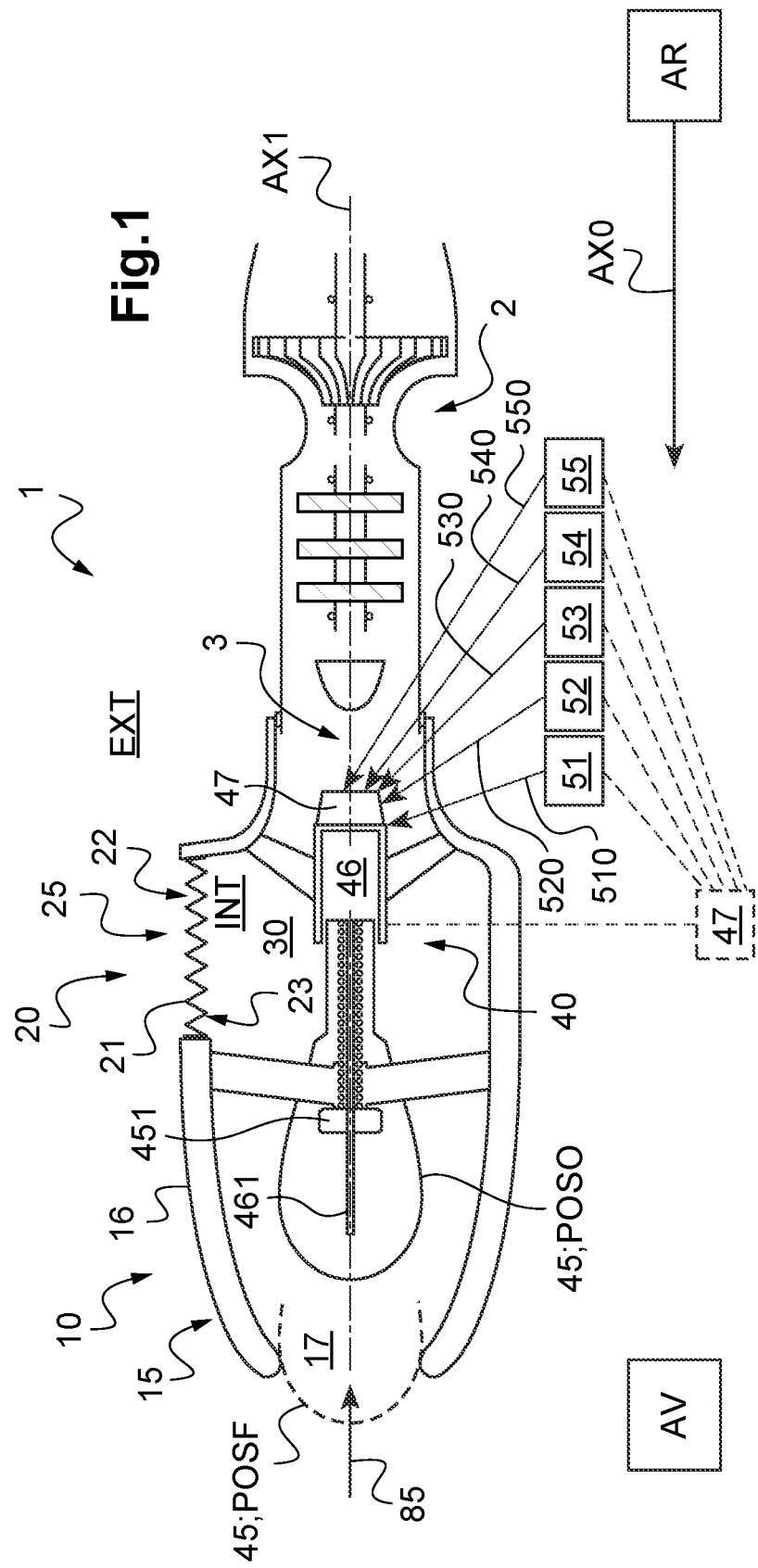
FIG. 1 is a diagram showing an air supply system having an ogive closure member.

FIG. 1 is a diagram showing an aircraft 1 according to the disclosure. This aircraft 1 comprises a power plant comprising at least one engine 2. Therefore, the aircraft 1 is equipped with an air supply system 10 for conveying air present in an external environment EXT situated outside the aircraft 1 towards at least one engine 2.

The air supply system 10 is configured to supply air to an air intake 3 of the engine 2 at an air supply flow rate. Such an air intake 3 may be an axial air intake according to the example shown in FIG. 1 but may alternatively be in the form of a radial air intake, as shown, for example, in FIG. 2.

To this end, the air supply system 10 comprises, in an internal environment INT, an air supply duct 30. The air supply duct 30 has an outlet, i.e., on outlet section, that opens on the air intake 3 of the engine 2. The air supply duct 30 is delimited by an outer shell that is, for example, substantially airtight. This outer shell may comprise at least one wall, at least one cover, etc.

In order to capture air from an external environment EXT and convey it into the engine 2 via the air supply duct 30, the air supply system 10 comprises a static air intake vent 25. This static air intake vent 25 comprises a passage provided in the outer shell and bringing the external environment EXT into fluidic communication with the air supply duct 30. Moreover, the static air intake vent 25 is equipped with a filtration device 20. This filtration device 20 comprises a filter medium 21 that covers, for example, the whole of said passage. The filter medium 21 opens on the air supply duct 30, upstream of the engine 2. It is noted that a filter medium 21 comprises a porous barrier, for example comprising one or more layers of fabric, foam, matting or other materials. The filter medium 21 comprises an outer face 22 facing the external environment EXT and an inner face 23 locally delimiting the air supply duct 30, openings bringing the outer face 22 into fluidic communication with the inner face 23.

Moreover, the air supply system 10 comprises a dynamic air intake vent 15 that also opens on the air supply duct. This air intake vent is described as dynamic insofar as air can be captured as a result of the forward travel of the aircraft 1. The dynamic air intake vent 15 may comprise a casing 16 of the outer shell delimiting a dynamic air intake channel 17. For example, the casing 16 is in the form of an annular divergent section. The dynamic air intake vent 15 and, in particular, its dynamic air intake channel 17 can be directed along a dynamic axis AX1 substantially parallel to an axis AX0 of the aircraft 1 running from its tail AR to its nose AV. A grating can also protect the dynamic air intake channel 17.

Moreover, the dynamic air intake vent 15 opens fluidically into the air supply duct 30, upstream of the filter medium 21 in a direction 85 from the dynamic air intake vent 15 towards the engine 2. Thus, the air entering the dynamic air intake vent 15 passes through the dynamic air intake channel 17 and into the air supply duct 30 to reach the engine 2 and the filter medium 21.

The dynamic air intake vent 15, and in particular its dynamic air intake channel 17, can be closed by a movable closure member 45. This closure member 45 is able to move in translation and/or to rotate between a closed position POSF shown in dotted lines in FIG. 1 and an open position POSO shown in a solid line in FIG. 1. In the closed position, the closure member 45 closes the dynamic air intake vent 15, i.e., the closure member 45 prevents air from flowing through the dynamic air intake channel 17. Conversely, in the open position POSO, the closure member 45 does not close said dynamic air intake vent 15, i.e., the closure member 45 does not prevent air from flowing through the dynamic air intake channel 17.

According to the example of FIG. 1, this closure member 45 comprises an ogive that is able to move in translation along the dynamic axis AX1.

Figure 2:
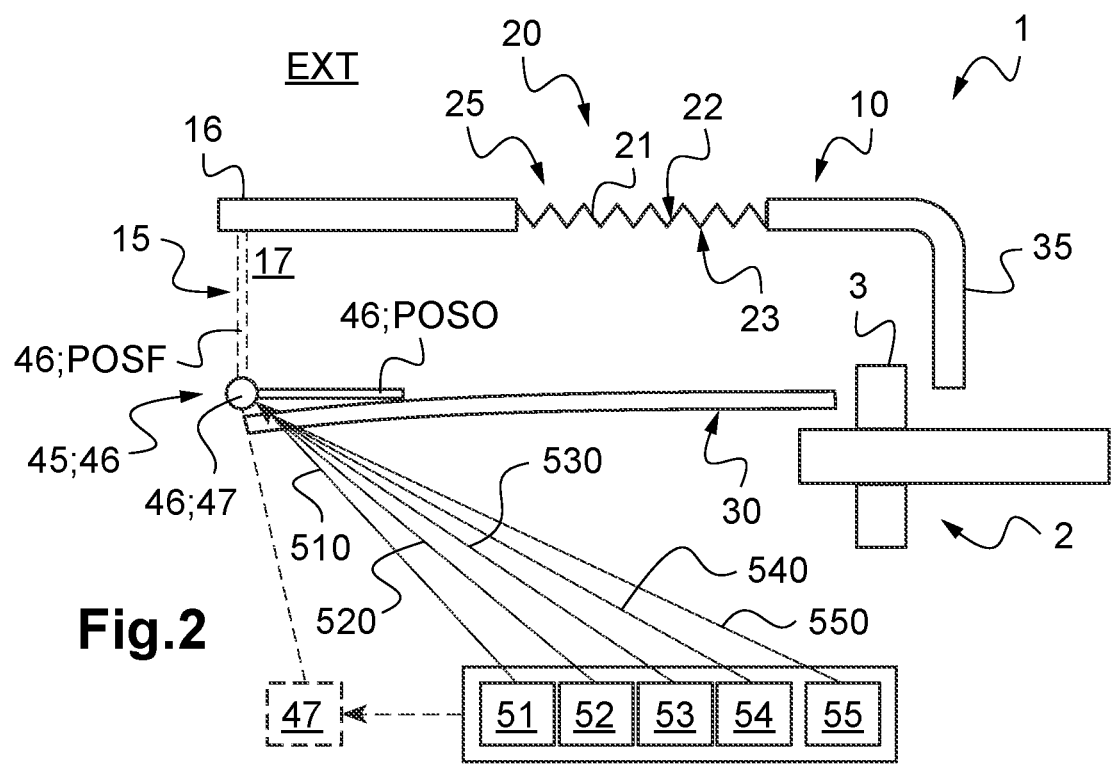
FIG. 2 is a diagram showing an air supply system having a flap closure member.

However, any other equivalent means may be used. By way of illustration, FIG. 2 shows a flap that is able to move in rotation.

Therefore, the air supply system 10 comprises an actuation device 40 for moving the closure member 45 on request. The actuation device 40 is therefore equipped with an actuator 46 cooperating with the closure member 45 to move it between the open position POSO and the closed position POSF. Such an actuator 46 may be in the form of an electrical, pneumatic, hydraulic actuator, etc. According to the example in FIG. 1, the actuator 46 may comprise a worm screw 461 that is able to rotate along its longitudinal extension axis, the closure member 45 having a nut 451 cooperating in threaded connection with the worm screw 461. According to the example of FIG. 2, the actuator 46 can be a rotary actuator comprising an output rod that is able to rotate together with the closure member 45.

Moreover, the actuation device 40 may comprise a controller 47 connected via a wired or wireless link to the actuator 46 in order to order the movement of the closure member 45 as a function of one or more analog or digital signals.

The closure member 45 and optionally its actuator 46 can be arranged in the internal environment INT of the air supply system, as shown in solid lines in the figures. For example, an actuator 46 carries the associated closure member 45. Fins or the like fasten this assembly to the outer shell.

Alternatively, as shown in dotted lines, a controller 47 may be located remotely, outside the internal environment INT.

Regardless of the embodiment, a controller 47 may comprise, for example, at least one processor and at least one memory, at least one integrated circuit, at least one programmable system, or at least one logic circuit, these examples not limiting the scope given to the expression "controller". The controller 47 may thus comprise one or more computers. The term "controller" refers to a unit that is able to operate each actuator 46 depending on input data and internal logic. The term "processor" may refer equally to a central processing unit or CPU, a graphics processing unit or GPU, a digital signal processor or DSP, a microcontroller, etc.

In order to determine the position in which the closure member 45 should be located, the air supply system 10 may comprise one or more of the following sensors. The term "sensor" is to be interpreted in the broad sense, a sensor being able to comprise at least one sensing device emitting an analog or digital measurement signal, or indeed a computing unit itself capable of emitting a signal depending on the received measurement signal and internal logic.

Thus, the air supply system 10 may comprise at least one control 51 connected via a wired or wireless link to the actuation device 40. The control or controls may be activated by a pilot, manually or by a voice instruction or indeed by a movement, in order to transmit a control signal 510 to the controller 47. A control 51 may be in the form of a switch with at least two positions, a touch-sensitive surface allowing one possibility to be chosen from several possibilities and, for example, from several modes of operation, etc.

The air supply system 10 may comprise at least one pollution sensor 52 connected via a wired or wireless link to the actuation device 40. The pollution sensor or sensors 52 are configured to emit a pollution signal 520, transmitted to the controller 47, carrying information indicating whether the air present in the external environment EXT is polluted. For example, a pollution sensor 52 may comprise a conventional frost sensing device and/or a pollution sensor 52 can sense particles of sand or dust in order to evaluate the number of particles in the air, etc. The controller 47 can receive this number of particles and compare it to a particle threshold in order to determine that the air is not polluted when the measured number of particles is lower than the particle threshold. According to another method, the pollution sensor 52 comprises a unit making this comparison and transmitting a pollution signal indicating whether or not the air is polluted.

The air supply system 10 may comprise a forward travel sensor 53 configured to emit a digital or analog forward travel signal 530 transmitted via a wired or wireless link to the controller 47. The forward travel signal 530 carries information indicating whether or not said aircraft 1 is moving according to a flight phase referred to as "a phase of forward travel". For example, a forward travel sensor 53 may comprise a speed sensing device for evaluating the speed air of the aircraft or another type of speed. The controller 47 may receive this speed and compare it with a speed threshold in order to determine that the aircraft 1 is carrying out a so-called phase of forward travel when the measured speed is higher than a speed threshold. According to another method, the forward travel sensor 53 comprises a unit making this comparison and transmitting a forward travel signal 530 indicating whether or not the aircraft 1 is carrying out a so-called phase of forward travel.

The air supply system 10 may comprise a clogging sensor 54 emitting an analog or digital clogging signal 540, transmitted via a wired or wireless link to the controller 47, the clogging signal 540 carrying information indicating whether or not said filter medium 21 has a clogging level greater than or equal to a clogging threshold. For example, a clogging sensor 54 may comprise one or more pressure sensing devices. The controller 47 can receive one or more measurement signals, and can decode them in order to deduce therefrom a clogging level compared with a clogging threshold in order to determine whether the filter medium 21 needs to be cleaned. According to another method, the clogging sensor 54 comprises a unit making this comparison and transmitting a clogging signal 540 indicating whether or not the filter medium 21 needs to be cleaned.

The air supply system 10 may comprise a positioning sensor 55 configured to emit a positioning signal 550 transmitted via a wired or wireless link to the actuation device 40, the positioning signal 550 carrying information indicating the geographical position of the aircraft 1. In the same way as set out above, the controller 47 can process the positioning signal 550 in order to determine said geographical position or can receive this geographical position. The controller 47 or the positioning sensor 55 can apply instructions in order to deduce therefrom the nature of the overflown terrain by using a model of the terrain.

Figure 3:
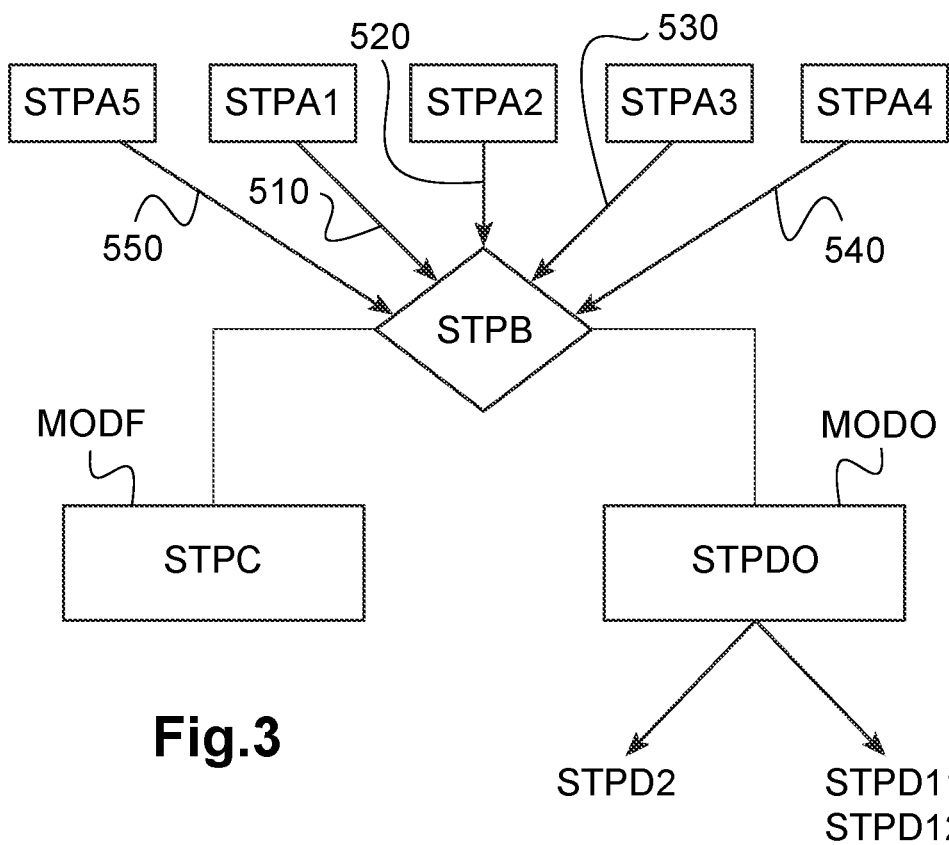
FIG. 3 is a diagram showing the method of the disclosure.

Moreover, said dynamic air intake vent 15 is oversized in order to be able to take in more air than necessary for the operation of the engine during a phase of forward travel of the aircraft 1 when the closure member 45 is in its open position POSO in order to apply the method shown in FIG. 3.

Figure 4:
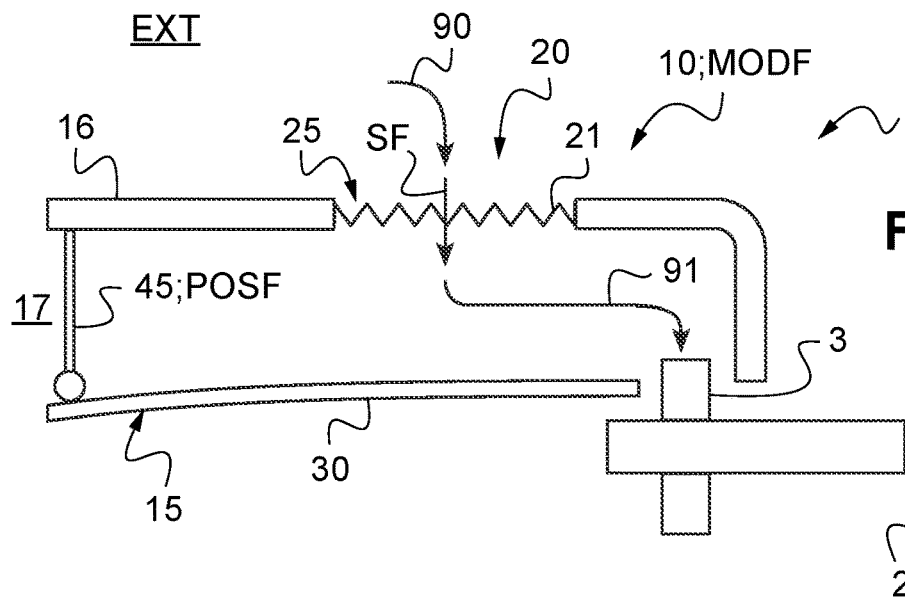
FIG. 4 is a diagram showing an air supply system in the filtered operating mode.
Figure 5:
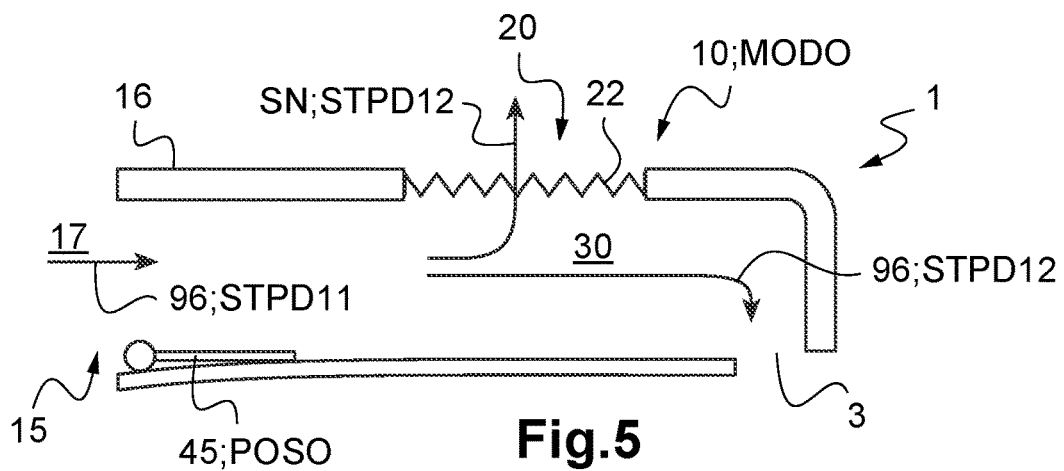
FIG. 5 is a diagram showing an air supply system in the unfiltered operating mode and during a phase of forward travel.
Figure 6:
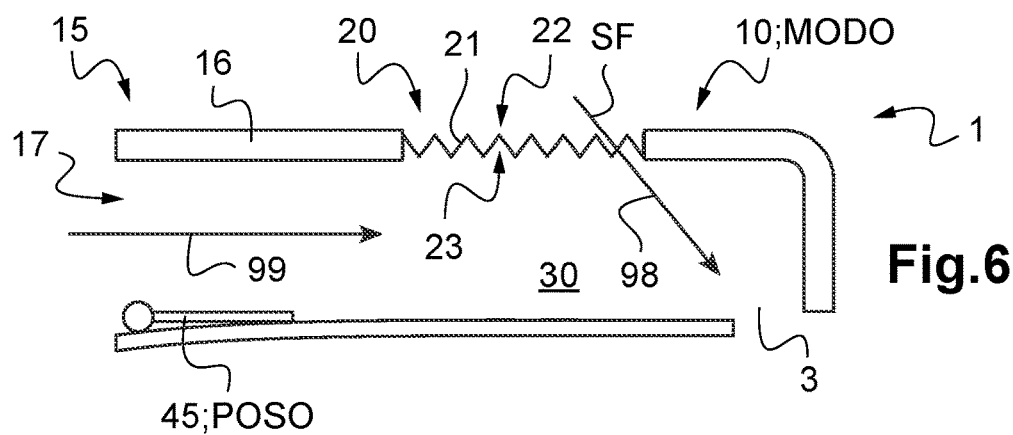
FIG. 6 is a diagram showing an air supply system in the unfiltered operating mode and not in a phase of forward travel.

In reference to FIG. 3, during a selection step STPB, the actuation device 40 is configured to determine whether the closure member 45 needs to be positioned in its closed position in order to apply a filtered operating mode MODF shown in FIG. 4 or in its open position in order to apply an unfiltered operating mode MODO shown in FIGS. 5 and 6.

To this end, during optional steps STPA1, STPA2, STPA3, STPA4, STPA5, the sensor or various sensors listed above transmit the signals 510, 520, 530, 540, 550 to the controller 47.

Therefore, the implementation of the unfiltered operating mode MODO can be a function:

at least of the air pollution in the external environment EXT evaluated during a step STPA2 of detecting air pollution implemented with the pollution sensor 52; and/or at least of a control signal 510 emitted by a control during a step STPA1 of generating a control signal 510 with a control 51, activated by a pilot; and/or at least of a clogging level of said filter medium 21 evaluated during a step STPA4 of detecting a clogging level implemented by a clogging sensor 54; and/or at least of the detection that said aircraft 1 is moving in a phase of forward travel evaluated during a detection step STPA3 implemented with the forward travel sensor 53; and/or at least of the nature of the overflown terrain evaluated during a step STPA5 of detecting the nature of the overflown terrain implemented with the positioning sensor 55 in order to determine the position of the aircraft 1 and plot this position on a map showing the nature of the terrain.

Thus, depending on the current case, the controller 47 can transmit a control signal to the actuator 46 during flight. During a step STPC, the actuator 46 positions the closure member in its closed position POSF during the filtered operating mode MODF. In reference to FIG. 4, the air then passes through the filter medium 21, in the direction shown by the arrow 90, in a filtration direction SF running from the outer face 22 to the inner face 23. Pollutants are stuck against the outer face 22. The filtered air flows through the air supply duct 30 in the direction shown by the arrow 91 to the air intake 3 of the engine 2.

According to various examples, the filtered operating mode MODF is applied as long as pollutants are detected in step STPA2 and optionally as long as the filter medium 21 is considered to have a clogging level lower than the clogging threshold following step STPA4, or indeed as long as the aircraft 1 is flying over a desert area according to an evaluation carried out in step STPA5.

Conversely, the controller 47 can transmit a control signal to the actuator 46 such that, during a step STPD0, the actuator 46 positions the closure member 45 in its open position POSO in order to apply the unfiltered operating mode MODO.

During a phase of forward travel of the aircraft 1 and in reference to FIG. 5, the dynamic air intake vent 15 then implements a step STPD11 of dynamic intake of a flow of air 95 as a result of the forward travel of the aircraft 1. The dynamic air intake vent 15 makes this flow of air 95 flow in the internal environment INT at an air intake flow rate higher than a minimum flow rate necessary in order to obtain said air supply flow rate required at the air intake 3 of the engine 2.

As a result of this air boost, the air supply duct 30 implements a step STPD12 of transferring a first portion 96 of the flow of air 95 to said engine 2 by suction, the air being sucked in by the engine 2, and transferring a second portion 97 of said flow of air 95 to the filter medium 21. Therefore, this second portion 97 of said flow of air 95 passes through the filter medium 21 in the opposite direction SN to the usual filtration direction in order to return to the external environment EXT. The second portion 97 of the flow of air 95 may tend to dislodge pollutants from the outer face 22 of the filter medium 21 and expel them to the external environment EXT in order to clean this outer face 22.

When not in this phase of forward travel and in reference to FIG. 6, air can enter the air supply duct 30, for example via the dynamic air intake vent 15 and the dynamic air intake channel 17 in the direction shown by the arrow 99 and via the filter medium 21 in the direction shown by the arrow 98.

Naturally, the present disclosure is subject to numerous variations as regards its implementation. Although several implementations are described above, it should readily be understood that an exhaustive identification of all possible embodiments is not conceivable. It is naturally possible to replace any of the means described with equivalent means without going beyond the ambit of the present disclosure and the claims.

For example, an air intake of the engine of FIG. 1 could be an axial air intake and the air intake of the engine of FIG. 2 could conversely be an axial air intake.

What is claimed is:

1. A method for supplying air to an engine of an aircraft at an air supply flow rate via an air supply system of the aircraft, the air supply system comprising a dynamic air intake vent that can be closed by a movable closure member, the movable closure member being movable between a closed position in which the movable closure member closes the dynamic air intake vent and an open position in which the movable closure member does not close the dynamic air intake vent, the air supply system comprising a static air intake vent equipped with a filtration device, the movable closure member being in the closed position during a filtered operating mode during which air from an external environment situated outside the aircraft is filtered by the filtration device;

wherein, the filtration device having a filter medium, the method comprises, during flight, an unfiltered operating mode that comprises the following steps:

positioning of the movable closure member in the open position, and during a phase of forward travel of the aircraft, dynamic intake of a flow of air as a result of the forward travel of the aircraft via the dynamic air intake vent at an air intake flow rate higher than a minimum flow rate necessary in order to obtain the air supply flow rate, then transfer of a first portion of the flow of air to the engine and a second portion of the flow of air to the filter medium, the second portion of the flow of air passing through the filter medium to return to the external environment in order to clean the filter medium, wherein the method comprises a step of detecting air pollution in the external environment, the implementation of the unfiltered operating mode being a function at least of the air pollution in the external environment.

2. The method according to claim 1 wherein the method comprises a step of generating a control signal with a control, activated by a pilot, the implementation of the unfiltered operating mode being a function at least of the control signal.

3. The method according to claim 1 wherein the method comprises a step of detecting a clogging level of the filter medium, the implementation of the unfiltered operating mode being a function at least of the clogging level.

4. The method according to claim 1 wherein the method comprises a step of detecting that the aircraft is moving in at least one phase of forward travel, the implementation of the unfiltered operating mode being a function at least of the detection that the aircraft is moving in the at least one phase of forward travel.

5. The method according to claim 4
wherein the at least one phase of forward travel comprises a phase of movement of the aircraft in a predetermined direction relative to a reference frame of the aircraft and at a speed higher than a speed threshold.

6. An air supply system configured to supply air to an engine of an aircraft at an air supply flow rate and capable of implementing the method according to claim 1, the air supply system comprising a dynamic air intake vent that can be closed by a movable closure member, the movable closure member being movable between a closed position in which the movable closure member closes the dynamic air intake vent and an open position in which the movable closure member does not close the dynamic air intake vent, the air supply system comprising a static air intake vent equipped with a filtration device;
wherein the filtration device comprises a filter medium that opens on an air supply duct of the air supply system; the dynamic air intake vent being fluidically connected to the air supply duct upstream of the filter medium in a direction from the dynamic air intake vent towards the engine to be supplied; the dynamic air intake vent being oversized in order to dynamically take in a flow of air, during a phase of forward travel of the aircraft in a non-closed operating mode, at an air intake flow rate higher than a minimum flow rate necessary in order to obtain the air supply flow rate, in order for a first portion of the flow of air to be conveyed to the engine and a second portion of the flow of air to exit the air supply duct via the filter medium for cleaning purposes.

7. A system according to claim 6
wherein the air supply system comprises an actuation device equipped with an actuator cooperating with the closure member, the actuator being configured to move the closure member between the open position and the closed position.

8. The system according to claim 7
wherein the air supply system comprises at least one control that can be activated by a pilot, the at least one control being connected via a wired or wireless link to the actuation device.

9. The system according to claim 7
wherein the air supply system comprises at least one pollution sensor connected via a wired or wireless link to the actuation device, the pollution sensor being configured to emit a pollution signal carrying information indicating whether the air present in the external environment is polluted.

10. The system according to claim 7
wherein the air supply system comprises a forward travel sensor configured to emit a forward travel signal transmitted via a wired or wireless link to the actuation device, the forward travel signal carrying information indicating that the aircraft is moving in at least one phase of forward travel.

11. The system according to claim 7
wherein the air supply system comprises a clogging sensor configured to emit a clogging signal transmitted via a wired or wireless link to the actuation device, the clogging signal carrying information indicating that the filter medium has a clogging level greater than or equal to a clogging threshold.

12. The system according to claim 7
wherein the air supply system comprises a positioning sensor configured to emit a positioning signal transmitted via a wired or wireless link to the actuation device, the positioning signal carrying information indicating the geographical position of the aircraft.

13. An aircraft equipped with at least one engine
wherein the aircraft comprises the air supply system according to claim 6 for conveying air present in an external environment situated outside the aircraft towards the engine.

14. A method for supplying air to an engine of an aircraft at an air supply flow rate via an air supply system of the aircraft, the air supply system comprising an air intake vent closable by a movable closure member, the movable closure member being movable between a closed position in which the movable closure member closes the air intake vent and an open position in which the movable closure member does not close the air intake vent, the air supply system comprising a static air intake vent equipped with a filtration device having a filter medium, the movable closure member being in the closed position during a filtered operating mode during which air from an external environment situated outside the aircraft is filtered by the filtration device;
the method comprising, during flight, an unfiltered operating mode that comprises the following steps:
positioning the movable closure member in the open position, and
during a phase of forward travel of the aircraft, intaking a flow of air as a result of the forward travel of the aircraft via the air intake vent at an air intake flow rate higher than a minimum flow rate necessary in order to obtain the air supply flow rate, then transfering a first portion of the flow of air to the engine and a second portion of the flow of air to the filter medium, the second portion of the flow of air passing through the filter medium to return to the external environment, and
detecting air pollution in the external environment, the implementation of the unfiltered operating mode being a function of the air pollution in the external environment.

15. The method according to claim 14
wherein the method comprises generating a control signal, with the implementation of the unfiltered operating mode being a function at least of the control signal.

* * * * *